Figure 1:
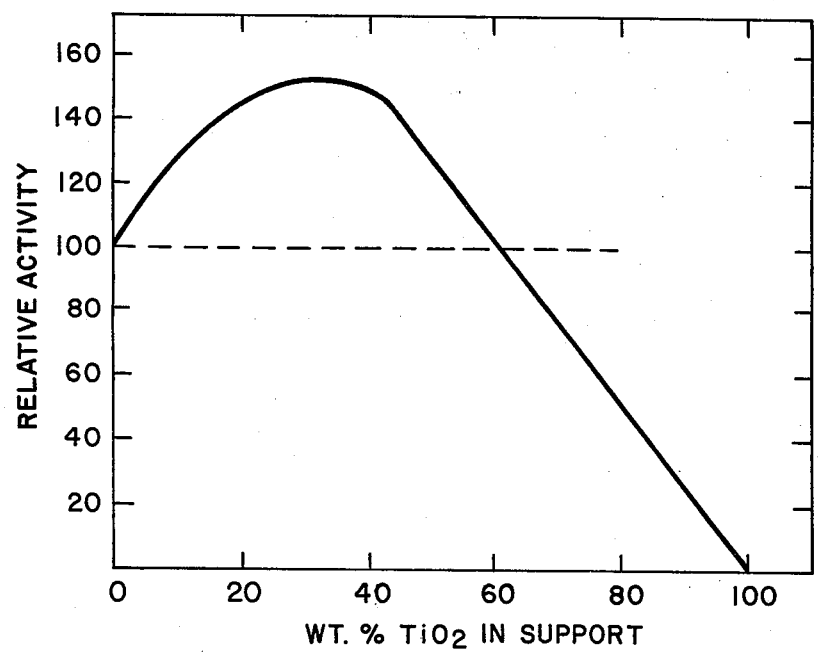

United States Patent [19]

Eberly et al.

[11] 3,884,834

[45] May 20, 1975

[54] PROCESS CATALYST

[75] Inventors: Paul E. Eberly, Baton Rouge;
Neville L. Cull, Baker, both of La.;
Fred J. Buchmann, deceased, late of Baton Rouge, La.; Cordelia Atkeson Buchmann, legal representative, Baton Rouge, La.

[73] Assignee: Exxon Research & Engineering Company, Linden, N.J.

[22] Filed: June 11, 1973

[21] Appl. No.: 368,821

Related U.S. Application Data

[63] Continuation-in-part of Ser. No. 183,381, Sept. 24, 1971, Pat. No. 3,758,600.

[52] U.S. Cl. ............... 252/439; 252/465; 260/673.5
[51] Int. Cl. .............................................. B01j 11/74
[58] Field of Search ............................ 252/439, 465

[56] References Cited
UNITED STATES PATENTS

| | | |
|---|---|---|
| 3,297,588 | 1/1967 | Kehl et al. ...................... 252/465 X |
| 3,132,111 | 5/1964 | Erickson ......................... 252/465 X |
| 3,179,602 | 4/1965 | Gremillion .......................... 252/465 |
| 3,269,958 | 8/1966 | Gatsis .............................. 252/465 X |
| 3,365,482 | 1/1968 | Khoobiar ........................ 252/465 X |
| 3,526,601 | 9/1970 | Fotis ............................... 252/465 X |
| 3,544,617 | 12/1970 | Oga et al. ....................... 252/465 X |
| 3,692,698 | 9/1972 | Riley et al .......................... 252/439 |

Primary Examiner—H. Sneed
Attorney, Agent, or Firm—J. E. Luecke; J. W. Ditsler

[57] ABSTRACT

A catalyst is provided comprising from about 0.5 to about 30 percent of a Group VIB metal oxide and/or sulfide on a support comprising a mixture of titania and alumina, wherein said titania is present in amounts ranging from about 15 to about 50 percent by weight. The catalyst may be employed to promote (a) the conversion of paraffins, olefins, cycloparaffins, cycloolefins and mixtures thereof to aromatics by contacting said paraffins and/or olefins with said catalyst at temperatures ranging from about 400° to about 1200°F. or (b) the hydrodesulfurization of sulfur contaminated hydrocarbon feed stocks.

9 Claims, 2 Drawing Figures

RELATIVE ACTIVITY FOR 10% $Cr_2O_3$ ON
$TiO_2/Al_2O_3$ CATALYSTS FOR HEXENE-1
AROMATIZATION AT 900°F

AROMATIZATION OF HEXENE-1 AT 900°F
AND 0.7 W./hr./W. AT 1 ATM. $N_2$

PROCESS CATALYST

CROSS-REFERENCE TO RELATED APPLICATION

This application is a continuation-in-part of application Ser. No. 183,381, filed Sept. 24, 1971, now U.S. Pat. No. 3,758,600, issued Sept. 11, 1973.

This invention relates to an improved catalyst composition. More particularly, this invention relates to a catalyst system for promoting (a) the conversion of paraffins, olefins, cycloparaffins, cycloolefins and mixtures thereof to aromatics and (b) the hydrodesulfurization of sulfur containing hydrocarbon mixtures.

The present invention relates to an improved catalyst comprising from about 0.5 to about 30 percent by weight (based on total anhydrous catalyst) of a Group VIB oxide and/or sulfide deposited on a support comprising a mixture of titania ($TiO_2$) and alumina ($Al_2O_3$), wherein said titania is present in amounts ranging from about 15 to about 50 wt. %, preferably from about 25 to about 35 percent by weight (based on total anhydrous support).

Figure 2:
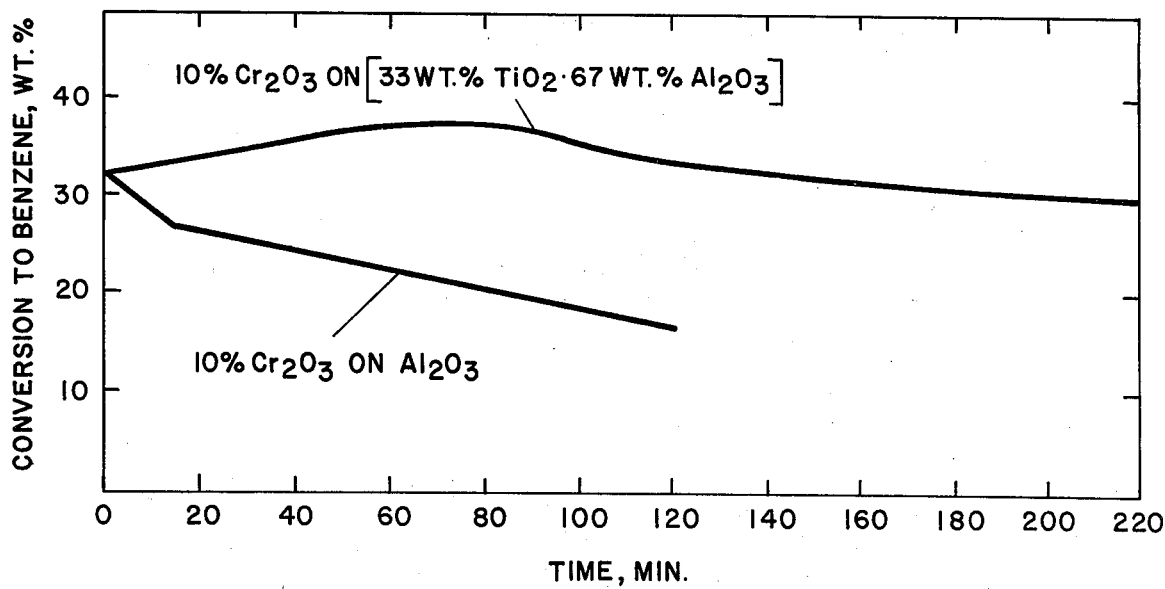

A more complete understanding of the present invention will be obtained from the following detailed disclosure and drawings wherein:

FIG. 1 is a graph showing the variation in relative activity of 10% $Cr_2O_3$ on various $TiO_2/Al_2O_3$ supports for hexene-1 aromatization at 900°F. with increasing $TiO_2$ content; and FIG. 2 is a graph comparing the variation in conversion to benzene in a hexene-1 aromatization with increasing time with a catalyst comprising chromia supported on 100% $Al_2O_3$ and a catalyst comprising chromia deposited on a 33 wt. % $TiO_2$.67 wt. % $Al_2O_3$ support.

Non-precious metal reforming catalysts have heretofore been employed comprising from about 1 to about 30 percent by weight of an oxide of a Group VIB metal impregnated on an alumina support. It has now been found that by incorporating from about 15 to about 50 percent by weight of titania into the support structure, the catalyst becomes highly effective for promoting the conversion of olefins and diolefins to aromatics or for promoting the hydrodesulfurization of sulfur contaminated hydrocarbon feedstocks. Moreover, the addition of titania to the alumina support has been found effective in substantially prolonging catalyst life. Additionally, mention of titania/alumina/chromia catalysts has been made in the prior patents. For example, Ellert et al. in U.S. Pat. No. 3,074,893 teach the use of chromia/titania cogels as supports for reforming catalysts. They also state that alumina can be added. Further, Gremillion in U.S. Pat. No. 3,179,602 has suggested that oxides of titanium may be used as a promoter for chromia-alumina catalyst compositions.

The titania/alumina supports of the present invention can be prepared by hydrolyzing mixtures of titanium alkoxides and aluminum alkoxides wherein the alkoxide groups each can contain from about 2 to about 5 carbon atoms. Hydrolysis can be conveniently accomplished in a one step procedure by contacting the alkoxides with neutral water or aqueous alcohol solutions at a temperature of about room temperature to 200°F., or preferably, 150°–200°F. The mixture can contain sufficient titanium alkoxide so that the mixed oxide catalyst support contains from about 15 to about 50 percent by weight of titanium dioxide, preferably from about 25 to about 35 percent by weight of titanium dioxide.

After hydrolysis, the mixture can be recovered for subsequent deposition or impregnation with a Group VIB metal oxide and/or sulfide. Although this impregnation can be done directly on the filtered product, it is preferable to dry and calcine the mixed oxide support. This calcination can be done in air at temperatures from 600° to 1,200°F. for periods of time ranging from 2 to about 20 hours.

The mixed titania/alumina supports, prepared as described above, exhibit surface areas of at least about 200 meters$^2$/gram and typically range from about 200 to about 400 meters$^2$/gram. Preferably, the support material has a surface area greater than about 225 meters$^2$/gram. The surface areas are measured by the standard B.E.T. technique involving the adsorption of nitrogen at liquid nitrogen temperatures. The pore volumes of the support range from about 0.3 to about 1.75 cubic centimeters/gram. These volumes are measured by the amount of nitrogen adsorbed at liquid nitrogen temperature and near one atmosphere pressure. Even higher surface areas can be achieved by varying the support preparation parameters or the calcination time or temperature.

Oxides and/or sulfides of Group VIB metals of the Periodic Table, specifically the oxides of chromium, molybdenum and tungsten and mixtures thereof are used in conjunction with the support. Generally, these oxides and/or sulfides are deposited substantially onto the surface of support in amounts ranging from about 0.5 to about 30 percent by weight, preferably about 0.5 to 20 percent by weight, still more preferably, 5 to 20 percent by weight, based on total catalyst. The Group VIB materials may be used alone or in combination with other catalyst metals or metal compounds, such as Group VIII metals or metal compounds, including cobalt, platinum, iron or nickel or the oxides and/or sulfides thereof. Impregnating the titania/alumina support with the Group VIB metal oxide and/or sulfide rather than dispersing the material within the support structure as per U.S. Pat. No. 3,074,893 permits a much greater percentage of the metal oxide and/or sulfide to participate in the catalytic reaction. Deposition of the catalyst constituents onto the support can be accomplished conveniently by immersing the support in an aqueous solution of the metal oxide or a derivative thereof. The Group VIB composition can subsequently be converted to the oxide during calcination. One technique found especially useful for impregnation is the incipient wetness technique. In this method, it is predetermined what volume of water is just sufficient to moisten the support uniformly and yet not have any extraneous liquid phase present. Knowing this volume, the liquid solution containing the metal oxide or derivative thereof is made up in sufficient volume so that when applied to the support a uniformly moistened, consistent paste results. Once the support has been impregnated, it is again calcined in air at temperatures ranging from about 800°–1,200°F. from a period of time ranging from about 2 to about 20 hours to obtain the improved metal oxide based catalyst of the present invention. If a metal sulfide or an oxide/sulfide mixture is the desired catalyst constituent, the metal oxide impregnated on the support can be converted to the sulfide form by contacting the impregnate with hydrogen sulfide, carbon disulfide, etc. Optionally, the conversion of the oxide to the sulfide form may be carried out in the reaction zone by contacting the metal oxide with a sulfur containing hydrocarbon at elevated temperature.

It has been found that the composition of the catalyst supports of the present invention is critical to obtaining maximum aromatization activity and extended catalyst life. Generally, it has been found that the support should contain from about 15 to about 50 wt. % titania in admixture with from about 50 to 85 wt. % alumina to obtain improved catalytic results. Preferably, the catalyst support contains from about 25 to about 35 percent titania with the balance of the catalyst support being composed of alumina. Various other compositions may be incorporated into the catalyst support structure; however, it is preferred that the support contain at least about 20 wt. % alumina, based on total support. As shown in FIG. 1, when titania is present in the support in amounts excessively greater than about 50 wt. %, the catalyst activity is not significantly greater than when a 100% alumina catalyst is employed.

The catalyst of the present invention is especially effective in converting (a) open chain and cyclic olefinic hydrocarbons having one or more ethylenic sites of unsaturation and having from about six to eighteen carbon atoms, (b) open chain and cyclic alkanes (paraffins) having from 6 to 18 carbon atoms, and (c) mixtures of said olefins and paraffins (aromatizable hydrocarbons) to aromatic hydrocarbons. The process can be employed with olefin and/or diolefin feed streams or with olefin-containing mixed refinery streams such as virgin or catalytic naphthas. Aromatic compounds may also be present in the process feed stock.

The aromatization process is generally conducted at temperatures ranging from about 400° to about 1,200°F., preferably 800°–1,000°F. and, most preferably, from 850°–900°F. Pressures in the range of 0–300 psig., preferably from about 0–50 psig. are typically employed. This pressure can be autogeneous or can be supplied by the addition of another gaseous substance. Since molecular hydrogen is a product of the reaction, it is sometimes preferred to employ inert gases such as nitrogen, methane, and the like. However, moderate pressures varying from 0 to 300 psig. hydrogen can be maintained in the reaction zone to suppress coke formation and prolong catalyst life. Typically, the temperature at which the aromatization process is carried out is increased with increasing hydrogen partial pressure. It is within the scope of this invention to adjust these operating variables such as temperature, pressure, feed rate, gas composition, etc. to secure the optimum conversion to aromatics for the particular feed in question.

The catalyst can be used in either a fixed bed or fluid bed operation with the feed stream being passed into contact with the catalyst at a space velocity of from about 0.05 to about 10 w/hr/w, i.e., pounds of feed per hour per pound of catalyst. Typically, the aromatization process is conducted using fixed bed techniques.

The catalyst of the invention can also be employed to promote the hydrodesulfurization of sulfur-contaminated hydrocarbon materials. For example, the catalyst can be employed in the hydrodesulfurization of gas oil fractions or a residuum, such as atmospheric and/or vacuum distillation bottoms, shale oil, shale oil residues, tar sands bitumen, etc. Typically, the hydrocarbon feed stock will contain a substantial proportion of materials boiling above about 500°F. at atmospheric pressure and contain from about 0.5 to 10 wt. % sulfur. In the desulfurization process, the catalyst, which may be maintained in a fixed bed or ebullating bed, is contacted with the feed stock and from about 500 to 20,000 standard cubic feet of hydrogen per barrel of feed stock at a temperature in the range of from about 500° to 950°F., a pressure in the range of 500 to 5,000 psig., and a liquid hourly space velocity of from about 0.3 to 5.0 volumes of feed stock per volume of catalyst per hour.

The catalyst, after use in an aromatization or hydrodesulfurization process, can be regenerated by heating the same in air oxygen at from about 800° to about 1,200°F. for a period of time sufficient to burn deposited carbon from the catalyst. Generally, the regeneration is conducted in situ for a time period ranging from about 2 to about 20 hours. After regeneration, the catalyst can be reused. It has been found that the catalysts of the present invention exhibit effective aromatization activity for a significantly longer period of time than prior alumina supported catalysts. Thus, longer cycle times within the reactor can be tolerated without adverse effect on aromatic conversion activity. Thus, catalysts of the present invention provide an effective means of converting the paraffin and/or olefin components of mixed refinery streams to aromatic materials or segregated olefin or paraffin streams to aromatic components thereby providing valuable gasoline blending components.

The following examples further illustrate the present invention. Unless otherwise specified, all percentages and parts are by weight.

EXAMPLE 1

The following example illustrates the preparation of catalysts of the present invention. It also demonstrates the existence of a critical range in the composition of the support for maximum performance of the material as an aromatization catalyst.

Catalyst supports were prepared by hydrolyzing aluminum sec.-butoxide, titanium tetraisopropoxide and varying mixtures thereof at 170°–190°F. using a neutral aqueous solution of isopropanol (65–70 percent by weight isopropanol). The support materials were then filtered, washed and preliminarily dried at 300°F. Thereafter, the supports were calcined in air at 1,000°F. for a period of 16 hours. The resultant calcined supports exhibited surface area and pore volumes as summarized in Table I below.

TABLE I

Properties after Calcination at 1000°F. for 16 hours

| Base Composition | Surface Area, M.²/g. | Pore Volume, cc./g. | Pore Radius, A |
|---|---|---|---|
| 100% Al$_2$O$_3$ | 242 | 1.52 | 126 |
| 10% TiO$_2$–90% Al$_2$O$_3$ | 295 | 1.03 | 70 |
| 33% TiO$_2$–67% Al$_2$O$_3$ | 327 | 0.78 | 48 |
| 50% TiO$_2$–50% Al$_2$O$_3$ | 346 | 1.07 | 61 |
| 80% TiO$_2$–20% Al$_2$O$_3$ | 201 | 0.58 | 57 |
| 100% TiO$_2$ | 36 | 0.16 | 89 |

The pore radius was calculated by taking twice the pore volume and dividing by the surface area. The maximum surface area of 346 M.²/g. was obtained with the 50% TiO$_2$–50% Al$_2$O$_3$ support. Minimum pore radius of 48A was obtained with the 33% TiO$_2$–67% Al$_2$O$_3$ support.

After calcination, 10% Cr$_2$O$_3$ (based on total catalyst) was impregnated upon each of the supports using the previously described incipient wetness technique using an aqueous solution of Cr$_2$O$_3$. The catalysts were then again calcined at 1,000°F. for 16 hours prior to testing for aromatization activity. After calcination, about 1 gram of catalyst was packed into a nominal ¼ inch stainless steel tube reactor which was placed in a sandbath maintained at 900°F. Nitrogen gas was passed over the catalyst at 40 cc./min. Then, the nitrogen was diverted through a saturator containing hexene-1 at 32°F. This resulted in a feed rate of hexene-1 of approximately 0.7 w/hr/w. The run was conducted for a two hour cycle time. The product stream was analyzed by gas chromatographic techniques. Results are tabulated in Table II.

TABLE II

Hexene-1 Aromatization at 900°F., 1 Atm. N$_2$ pressure, 0.7 w/hr/w and 2 Hr. Cycle Time

| Catalyst | Conversion to Benzene Wt. % | Relative Activity |
|---|---|---|
| 10% Cr$_2$O$_3$ on Al$_2$O$_3$ | 23.83 | 100 |
| 10% Cr$_2$O$_3$ on [10% TiO$_2$.90% Al$_2$O$_3$] | 30.92 | 130 |
| 10% Cr$_2$O$_3$ on [33% TiO$_2$.67% Al$_2$O$_3$] | 36.25 | 152 |
| 10% Cr$_2$O$_3$ on [50% TiO$_2$.50% Al$_2$O$_3$] | 30.57 | 128 |
| 10% Cr$_2$O$_3$ on [80% TiO$_2$.20% Al$_2$O$_3$] | 10.75 | 45 |
| 10% Cr$_2$O$_3$ on TiO$_2$ | 0.3 | 1.2 |

The 10% Cr$_2$O$_3$ on [33 TiO$_2$.67 Al$_2$O$_3$] gave the highest conversion to benzene of 36.25 percent. The conversion results obtained are transformed into relative activity values in Table II by treating the conversion to benzene with 10% Cr$_2$O$_3$ on 100% Al$_2$O$_3$ as 100. On this basis, the aforementioned catalyst having a support containing 33% TiO$_2$ exhibited a relative activity substantially higher than that of the catalyst containing no titania.

The variation in relative activity with increasing titania in the catalyst support, based on the data in Table II, is shown in FIG. 1. The existence of a critical range in the amount of titania in the support of maximum performance of the catalyst system as an aromatization catalyst is readily apparent. It can be seen that maximum activity is obtained when the alumina support contains titania in an amount up to about 60 percent by weight.

EXAMPLE 2

The following example illustrates that the catalysts of the present invention maintain their aromatization activity over extended periods of time as compared to a catalyst supported on 100% alumina.

Catalysts having the following compositions: 10% Cr$_2$O$_3$ on 100% Al$_2$O$_3$, 10% Cr$_2$O$_3$ on [33% TiO$_2$.67% Al$_2$O$_3$] were prepared and evaluated for the aromatization of hexene-1 over an extended period of time following the procedure described in Example 1. As shown in FIG. 2, the catalyst containing 33% titania exhibited conversions to benzene of over about 30 percent with little deactivation over a four hour reaction period. In fact, during the first hour, the catalyst activity increased. With the titania-free catalyst, deactivation was continuous and rapid. At the end of two hours, the conversion to benzene was only about 50 percent of the initial value.

What is claimed is:

1. A catalyst comprising from about 0.5 to about 30 wt. %, based on total catalyst, of an oxide or sulfide or mixture thereof of chromium, said chromium being deposited upon a support consisting essentially of a mixture of from about 15 to 50 wt. % titania and at least about 20 wt. % alumina, each based upon the weight of the support.

2. The catalyst of claim 1 wherein the titania is present in the support in amounts ranging from about 25 to about 35 percent by weight.

3. The catalyst of claim 1 wherein the support exhibits a surface area of at least about 200 meters$^2$/gram.

4. An aromatization catalyst for converting (a) open chain and cyclic olefinic hydrocarbons one or more ethylenic sites of unsaturation and having from about 6 to 18 carbon atoms, (b) open chain and cyclic alkanes having from 6 to 18 carbon atoms, and (c) mixtures of said olefins and paraffins to aromatic hydrocarbons, said catalyst comprising from about 0.5 to about 30 wt. %, based on total catalyst, of an oxide or sulfide of chromium or mixture thereof, said chromium being deposited upon a support comprising a mixture of from about 15 to 50 wt. % titania and at least about 20 wt. % alumina, each based upon the weight of the support.

5. The catalyst of claim 4 wherein the titania is present in the support in amounts ranging from about 25 to 35 percent by weight.

6. The catalyst of claim 4 wherein the support exhibits a surface area of at least about 200 meter$^2$/gram.

7. The catalyst of claim 4 wherein the catalyst comprises from about 5.0 to 20 wt. % chromia, based on total catalyst, said chromia deposited substantially on the surface of a support comprising from about 15 to about 50 % by weight titania and at least about 20 wt. % alumina, each based upon the weight of the support.

8. A hydrodesulfurization catalyst for treating hydrocarbon feedstocks containing a substantial proportion of materials boiling above about 500°F. at atmospheric pressure and having from about 0.5 to 10 wt. % sulfur, said catalyst comprising from about 0.5 to about 30 wt. %, based on total catalyst, of an oxide or sulfide of chromium or mixture thereof, said chromium being deposited upon a support consisting essentially of a mixture of from about 15 to 50 wt. % titania and at least about 20 wt. % alumina, each based upon the weight of the support.

9. A catalyst comprising from about 5.0 to 20 wt. % chromia, based on total catalyst, said chromia deposited substantially on the surface of a support comprising from about 15 to 50 percent by weight titania and at least about 20 wt. % alumina, each based upon the weight of the support.

* * * * *